C. F. MARSTON.
SIGNAL DEVICE.
APPLICATION FILED MAY 26, 1911.
1,065,884.
Patented June 24, 1913.
2 SHEETS—SHEET 1.
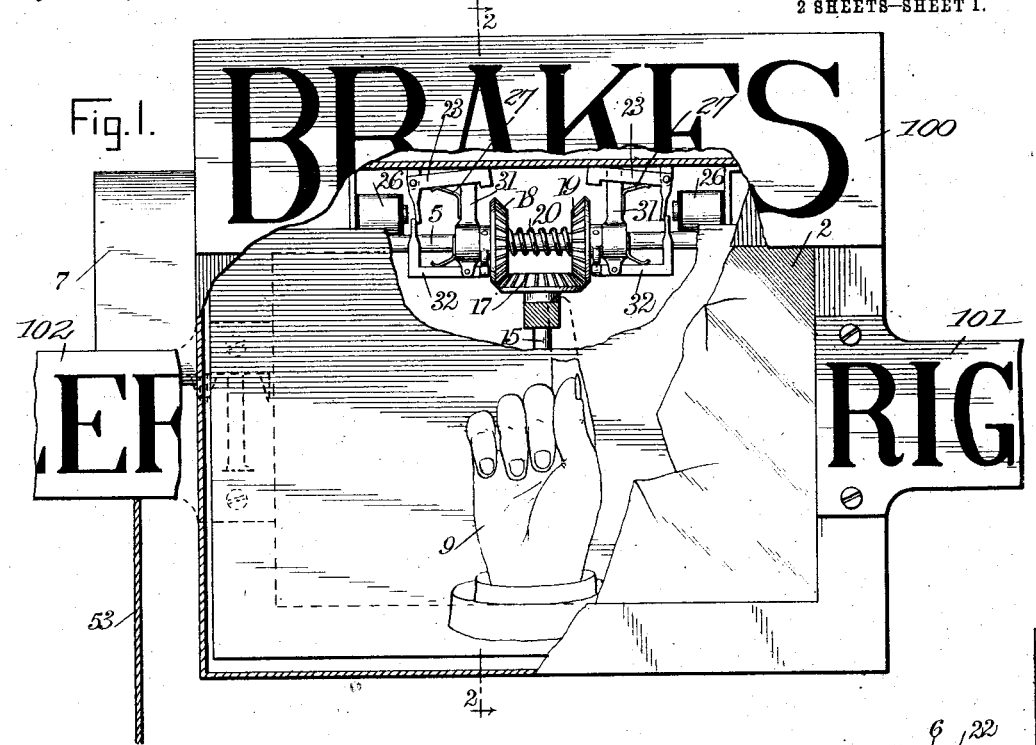
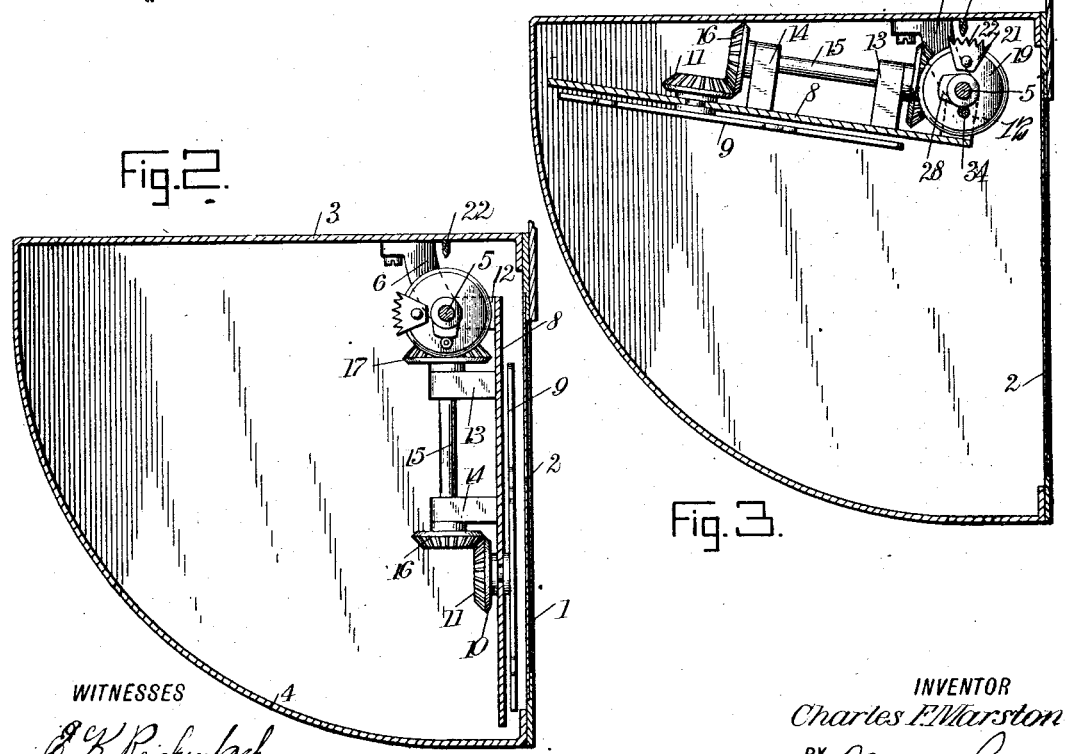
WITNESSES
INVENTOR
Charles F. Marston
BY
ATTORNEYS C. F. MARSTON.
SIGNAL DEVICE.
APPLICATION FILED MAY 26, 1911.
1,065,884.
Patented June 24, 1913.
2 SHEETS—SHEET 2.
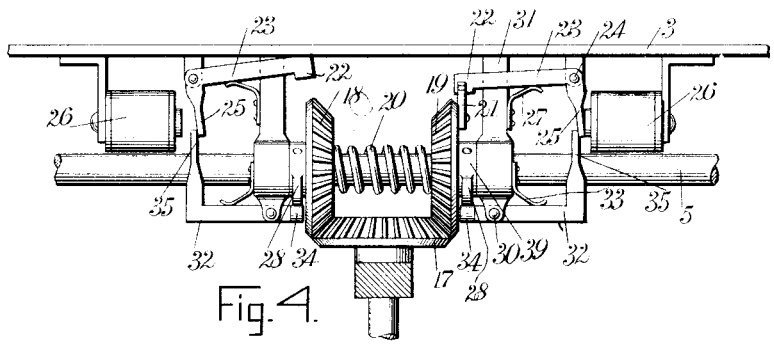
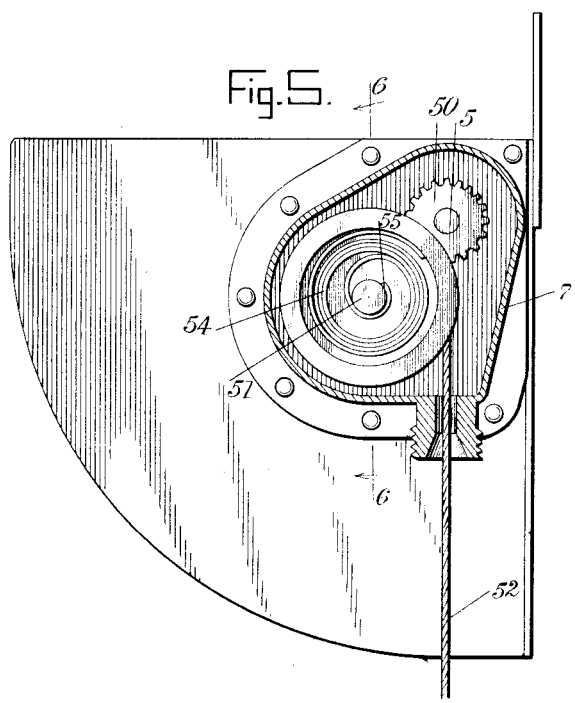
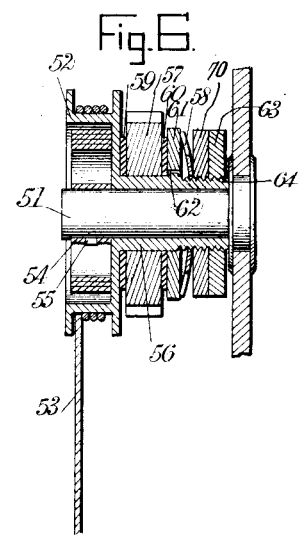
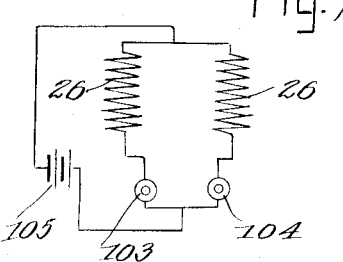
WITNESSES
C. K. Reichenbach.
I. L. Gallagher.
INVENTOR
Charles F. Marston
BY Munn & Co
ATTORNEYS

UNITED STATES PATENT OFFICE.

CHARLES F. MARSTON, OF NEW YORK, N. Y.

SIGNAL DEVICE.

1,065,884.  Specification of Letters Patent.  Patented June 24, 1913.

Application filed May 26, 1911. Serial No. 629,551.

*To all whom it may concern:*

Be it known that I, CHARLES F. MARSTON, a citizen of the United States, and a resident of the city of New York, borough of Manhattan, in the county and State of New York, have invented a new and Improved Signal Device, of which the following is a full, clear, and exact description.

My invention relates generally to signal devices and more particularly it involves an improved structure for use on automobiles whereby the driver may notify drivers of following vehicles of movements about to be made.

The object of my invention is to provide an improved form of signal especially adapted for use on automobiles, the signal being located at the rear of the car and being operable by the driver thereof through the medium of suitable electric circuits and the braking mechanism, the signal comprising a movable pointer which will indicate whether the car is to turn to the right or left or whether the brakes are to be applied; suitable means are provided in order to enable the pointer to be brought to the proper position, the signal being operated primarily by the application of the brakes and the means controlling the direction in which the index points being operable by certain means, such as an electro-magnet.

A further object of my invention is to provide a simple and compact device of the class specified which shall consist of the fewest parts in order to accomplish the desired result, the construction and finish being such that an efficient structure may be provided at a low cost.

Reference is to be had to the accompanying drawings, forming a part of this specification in which like characters of reference denote corresponding parts in all the views, and in which—

Figure 1 is a front view of the signal, parts being broken away in order to show the operating mechanism thereof; Fig. 2 is a vertical sectional view thereof, on the line 2—2 of Fig. 1; Fig. 3 is a similar view showing the pointer in inoperative position; Fig. 4 is an enlarged detailed view of the means for controlling the direction in which the pointer extends; Fig. 5 is a vertical sectional view showing the means whereby the pointer is brought to exposed position; Fig. 6 is a vertical sectional view, on the line 6—6 of Fig. 5. Fig. 7 is a diagrammatic representation of the electrical circuits.

My device is made up of a suitable casing preferably of the shape shown in Figs. 1, 2, and 3, one side of the casing being provided with a suitable opening 1 which preferably incloses a piece of glass 2 whereby the interior of the casing may be seen, this side of the casing being termed the front and the side 3 the top, the other side being preferably made in the arc of a circle in order to make the device as compact as possible. Suitably secured in position adjacent the opening in the casing is a plurality of marks 100, 101, 102, which read Brakes, Right and Left; suitable means to be hereinafter described are movable to point to any one of these marks in order to indicate the stopping of the vehicle or the turning thereof. Extending longitudinally of the interior of the casing and adjacent the top and the front thereof is a shaft 5 which is suitably supported in brackets 6, this shaft extending without the casing into a smaller casing 7, secured to the side of the first casing. Suitably secured on the shaft 5 and intermediate the ends thereof is a plate 8 having an index or pointer 9 pivotally secured at 10 to the outside portion thereof, the inner end of the pivotal supporting means being provided with a beveled gear 11; the plate is supported by the shaft 5 by any suitable means, such as short arms 12, the construction and arrangement being such that when the plate is closely adjacent the opening 1 in the casing, as shown in Fig. 2, it will extend substantially vertical with the index or pointer 9 extending in the proper direction, as hereinafter explained, the plate being brought to such position by turning the shaft 5, the inoperative or unexposed position of the plate and pointer being indicated in Fig. 3. The rear of this plate is provided with suitable supporting members 13, 14, through which a vertically extending shaft 15 passes, the lower end of which is provided with a beveled gear 16, meshing with the gear 11; the upper end of this shaft is also provided with a beveled gear 17 which meshes at opposite points with beveled gears 18, 19, freely rotatable on the shaft 5. A helical spring 20 having its opposite ends in engagement with each of the beveled gears 18, 19, is secured in such position by being extended around the shaft 5, the purpose of the spring being to retain the gears 18, 19, in suitable position with respect to each other, and to maintain the beveled gears 17 and 16 against wabbling or shaking whereby the index or pointer 9 will be steadily supported on the plate 8 during movement of this plate from the position shown in Fig. 3 to that shown in Fig. 2.

From the description thus far it will be apparent that if the longitudinally extending shaft 5 is turned in a counterclockwise direction (facing the left end of Fig. 3) that the plate 8 with the index 9 thereon will be moved into the position of Fig. 2, the index being retained in its normally vertical extending position, as shown in Fig. 2, no movement of the index to either side of the index being permitted by reason of the loose mounting of the beveled gears 18, 19, on the shaft 5; in such position the index points to the word Brakes, as shown in Fig. 1. I propose, however, to enable the index to point to either side of the casing whereby it may indicate the words Left or Right as desired, this movement being effected in the following way: The outer side of each of the beveled gears 18, 19, is provided with a fixed extending stop 21, having teeth 22 therein, any one of these teeth in each of these stops being adapted to be engaged by the outer end portion of one arm 22 of a bell crank lever 23 pivotally supported at 24 to the top side 3 of the casing; the other arm 25 of each bell crank is of magnetic material and is closely adjacent the pole face of an electro-magnet 26 so that if current is flowing through this electro-magnet it will tend to move the outer end 22 of the bell crank lever downwardly and into engagement with the stop 21 whereby either gear 18 or 19 will be held against turning as the case may be. Each of the bell cranks 23 is maintained in the position shown in Fig. 1 by any suitable means, such as a leaf spring 27; in order to insure that the outer end of either bell crank shall be retained in engagement with either stop 21, after the current through the electro-magnet 26 is broken, I have provided suitable locking means, preferably as shown in Fig. 4. Rigidly supported on the shaft 5 and preferably adjacent each of the beveled gears 18 and 19 is a cam 28 which will turn with the shaft by reason of the pin 39 in engagement therewith. Pivotally secured, as at 30, to the lower end of each of the hangers 31, adjacent each of the beveled gears 18, 19, is a dog 32 engaged by leaf spring 33 carried by the hanger 31, as shown particularly in Fig. 4; one end 34 of each dog is adapted to be engaged by each cam 28 as the shaft 5 is turned, thereby bringing the other end 35 of either dog into engagement with the end 25 of either bell crank 23 and on either side thereof, depending on whether current has been flowing through the particular electro-magnet or not.

The operation of the means for effecting the movement of the pointer to the words Right or Left may be described as follows: It has previously been stated that merely turning the shaft 5, the index 9 being in normal position, as shown in Fig. 1, will turn the plate 8 with the index 9 thereon to the position shown in Fig. 1, the index or pointer extending toward the word Brakes; when it is desired to bring the pointer into exposed position in front of the opening 1 in the casing and pointing to either left or right it is necessary only to close the circuit leading from the source of energy 105 through either electro-magnet 26 by means of push button 103 or 104 when the pointer will extend to either word as the case may be. Suppose the circuit is closed through the electro-magnet 26 at the right of Fig. 4, the plate and pointer being in the position shown in Fig. 3. The current flowing through this electro-magnet will attract the end 25 of the bell crank 23, thereby bringing the outer end 22 into engagement with one of the teeth on the stop 21 carried by the beveled gear 19, thereby holding this gear fixed; this movement of the end 25 of the bell crank is permitted, by reason of the fact that the lower end 34 of the dog 32 is in inoperative position and out of engagement with the cam 28, as shown in Fig. 3, thereby allowing the end 35 of the dog to fall below the lower end of the portion 25 of the bell crank 23; the gear 19 being held against turning, as shown in Fig. 4, turning of the shaft 5 and with it the plate 8 and pointer 9 will move the pointer to the word Left of the signal since during the downward swing of the pointer the beveled gear 17 will rotate by reason of the fixed gear 19, thereby turning the vertically extending shaft 15 which in its turn will move the index. It is necessary only to keep the circuit of the electro-magnet 26 closed for a short time at the beginning of the turning of the shaft 5 since after the shaft 5 has turned, the cam 28 thereon will come into engagement with the end 34 of the dog 32, bringing the upper end 35 of this dog against the inside of the end 25 of the bell crank 23, holding this bell crank in the position shown in Fig. 4 and keeping the beveled gear 19 in fixed position. This description applies equally well to either electro-magnet 26 since the operation of the parts on either side of the vertically extending shaft 15 is identical, the difference being in the result which in one case brings the index 9 pointing to Right and in the other case brings the index pointing to the word Left. The description of the operation of the parts at the left side of Fig. 4 may be described, however, when the parts at the right side thereof have been operated as just described; by reason of the fact that no current has been flowing through the electromagnet 26 at the left side of Fig. 4, the bell crank will remain in the position shown; after the shaft has turned a short distance the cam 28 will come into engagement with the lower end 34 of the dog 32, thereby bringing the upper end of this dog 35 into engagement with the outside of the short arm 25 of the bell crank 23, thereby holding the end 22 of this bell crank fixed in inoperative position, and even though the circuit was then completed through this electromagnet 26, the bell crank could not be moved and the parts would be held against damage. The parts are returned to their normal position by merely turning the shaft 5 in the opposite direction, which turning of the shaft will bring the index back to its normal position because the beveled gear 19 cannot move until the shaft comes into such a position that the cam 28 thereon comes out of engagement with the dog 32 which will permit the dog to come into inoperative position, thereby allowing the spring 27 to move the bell crank 23 to inoperative position and out of engagement with the stop 21.

In order to turn the shaft 5 I have provided means contained within the smaller casing 7, which means are preferably operable by movement of the brake lever on the car; since the angle through which this lever is moved when applying the brakes varies, the construction and arrangement of this means is such that the shaft 5 will be turned and the plate and index moved to exposed position through any angle of movement of the lever even though such movement is not sufficient to apply the brakes. The end of the shaft 5 extends into the smaller casing 7 and a suitable cog wheel 50 is secured to the end of the shaft therein; contained within this casing and rigidly supported by the side member of the larger casing is a stub shaft 51 having a drum 52 freely rotatable thereon, this drum being adapted to receive a number of turns of an operating cord or wire 53, the interior of the drum being provided with a number of convolutions of a spring material 54, which is, in effect, a spiral spring, one end of which is in engagement with the drum and the other end of which is in engagement, as at 55, with the stub shaft. The inner side of the drum is provided with a reduced portion 56 extending along the shaft 51, this reduced portion having rotatably mounted thereon a cog wheel 57 and a spring member 58, there being suitable washers, such as fiber, 59, 60, to provide for frictional gripping of the parts; between the spring 58 and one of these washers 60 is a plate 61 which is in engagement with a projection 62 on the reduced portion 56 so that turning of the drum will always turn this plate; the cog wheel 57, the spring 58, the washers 59, 60, and the plate 61 are retained in frictional engagement with each other of a desired amount, by means of a nut 70 and a lock nut 63 engaging the threaded end 64 of this reduced portion 56. From this description of the parts, as shown in Fig. 6, it will be obvious that movement of the cord or wire 53 will turn the drum 52 and will also turn the cog wheel 57 since the friction between the parts which is maintained by the spring 58 will insure this; however, if after a certain movement of the drum the cog wheel 57 is held against further turning, further movement of the cord or wire 53 will permit the drum 52 to turn without moving the cog wheel 57 since the cog wheel and the drum are not rigidly held together, but frictionally so; if the force on the cord or wire 53 is then released, the spiral spring 54 will tend to unwind itself, thereby turning the drum 52 and winding the cord or wire 53 thereon, the cog wheel 57 turning with it until some point is reached where this cog wheel is again held against movement, further turning of the drum being permitted by reason of the frictional engagement of the parts until the cord or wire again comes back into its first position on the drum. The cog wheel 57 which is mounted on the drum 52 is adapted for engagement with the cog wheel 50 on the end of the shaft 5 so that pulling the cord 53 will turn the drum and the cog wheel 57 and the shaft 5, thereby bringing the plate 8 with the pointer 9 thereon from the position shown in Fig. 3 to that shown in Fig. 2; it may be, however, that the distance through which the cord 53 is drawn is greater than that distance necessary to merely move the plate and pointer from one position to the other, the particular arrangement, however, of the spring member and the cog wheel permitting further movement of the drum without further movement of the plate and without damage to the parts since the exposed and unexposed positions of the plate are determined by engagement of portions thereof with the front and side of the larger casing.

In using my device the index or pointer 9 is positioned on the plate 8 so that mere turning of this plate brings the pointer into vertically extending position, pointing to the word Brakes, as shown in Fig. 1; this movement of the plate and pointer is effected by movement of the brake lever to which the operating cord or wire 53 is attached. If it is desired to indicate to following vehicles that the car is to make a turn to the right or left, the driver presses a suitable push button connected to either of the electromagnets 26 before applying the brakes when movement of the brake rod before making the turn brings the plate into exposed position, the index or pointer turning to the words Right or Left by the time it has come to exposed position; this movement of the index to Right or Left is effected by the downward movement of the plate through the coöperation of the electromagnet operated by the push button and parts on the shaft which move the plate. Thus it will be seen that I have provided a simple and compact signal device which consists of few parts and which requires merely pressing a button in order to indicate to other vehicles in what direction a car provided with this signal is about to turn; in the event of no turn being made and brakes only being applied, the movement of the brake lever itself operates the signal device. While I have shown a particular means for effecting these results, it is obvious that the different parts may be differently proportioned and the size and shape of the device may be varied without departing from the spirit and scope of the invention as defined in the following claims.

Having thus described my invention, I claim as new, and desire to secure by Letters Patent:—

1. The combination of a casing, of marks supported in position adjacent the casing, an opening in one side of the casing, a plate within the casing and movable from one position to another, the plate being normally out of view, an index movably mounted on the plate, means for maintaining the index in one position on the plate, means for moving the plate and with it the index to exposed position, the index pointing to one of the marks, there being other means for moving the index on the plate as the plate moves, whereby the index may point to other marks.

2. The combination of a casing, an opening in one side thereof, marks supported adjacent the opening, each of the marks indicating a move to be made by the operator, a plate movably supported within the casing and normally out of view, an index movably supported on the plate, means for bringing the plate and the index into view adjacent the said opening with the index pointing to one of the marks, there being a plurality of separate means within the casing coöperating with each other and also with the index, operation of which will cause the index to point to other marks as the plate and the index are moved to exposed position.

3. The combination of a casing, an opening in one side thereof, a plurality of marks positioned adjacent the opening, a plate movably supported within the casing, the said plate having an index thereon, the index being movable on the plate to different positions, the plate and index being normally out of view, means for bringing the plate and index into view adjacent the opening with the index pointing to one of the marks, a plurality of separate means in operative relation with the said index and adapted for coöperation with the means for moving the plate, whereby the plate and index may be moved to exposed position with the index pointing to other marks.

4. The combination of a casing having marks thereon, one side of the casing being provided with an opening, an index pivotally supported within the casing and adapted to be moved adjacent the said opening and into view, the said index being normally out of view, means being provided for effecting movement of the said index into exposed position and pointing to any one of the said marks.

5. The combination of a casing, marks adjacent the casing, the casing being provided with an opening, a plate pivotally supported within the casing, an index movably mounted on the plate, and means whereby the plate and index may be swung into position adjacent the said opening with the index pointing to one of the marks.

6. The combination of a casing, marks on the casing, a plate pivotally supported within the casing, and normally out of view, the said casing being provided with an opening, an index pivotally supported on the said plate, and means whereby the plate and the index may be moved into exposed position adjacent the opening with the index pointing to one of the said marks, and other means coöperating with the first-named means whereby the index may point to any one of the remaining marks.

7. The combination of a casing having an opening in one side thereof, marks on the outside of the casing, a plate within the casing and pivotally supported therein, means for maintaining the plate normally out of view, an index movably supported on the plate, and means whereby the plate may be moved to exposed position with the index thereon pointing to one of the said marks.

8. The combination of a casing having marks thereon, the casing having an opening in one side thereof, a plate pivotally mounted within the casing and normally out of view, an index movably supported on the plate, means for moving the plate adjacent the opening and into view, and other means coöperating with the last-named means for pointing the index to one of the said marks.

9. The combination of a casing having an opening in one side thereof, marks carried by the casing, a shaft extending longitudinally of the casing, a plate carried by the said shaft and movable therewith, the said plate being normally out of view, an index movably supported on the said plate, and means connected to the said shaft for moving the said plate into exposed position adjacent the said opening, and other means cooperating with the said index whereby as the plate is swung into exposed position the index may be moved to point to some of the said marks.

10. The combination of a casing having an opening in one side thereof, marks supported in position adjacent the casing, a shaft within the casing and extending longitudinally thereof, a plate carried by the shaft and movable therewith and normally out of view, an index movably supported on the said plate, means whereby the plate may be brought into exposed position adjacent the said opening, and other means carried by the casing and said shaft and cooperating with a portion of the said index whereby as the plate is swung the said index will be moved to point to one of the said marks.

11. The combination of a casing, a plate within the casing, marks adjacent the casing, a shaft within the casing, the plate being connected to the shaft and being movable therewith, means for holding the shaft in one position and thereby retaining the plate out of view, an index carried by the plate and movable thereon, means whereby the plate may be moved, other means being provided for actuating the said index when the means for moving the said plate are actuated, whereby the index will point to one of the said marks.

12. The combination of a casing, a shaft within the casing, a plate mounted on the shaft, an index movably mounted on the plate, a plurality of elements carried on the shaft, means between the said elements and the index, whereby when the shaft is turned and either of the said elements is held against movement, the index will point to the corresponding one of two positions.

13. The combination of a casing, a shaft within the casing, a plate mounted on the shaft, means for keeping the plate adjacent one side of the casing and out of view, an index movably carried on the plate, a plurality of cog wheels carried on the shaft, and means between the cog wheels and the index, whereby when either of the said wheels is held against turning and the said shaft is rotated the index will point to the corresponding one of two positions when brought into view.

14. The combination of a casing, a shaft within the casing, means whereby the shaft may be turned, a plate within the casing carried by the shaft and being normally out of view, an index movably supported on the plate, a plurality of cog wheels carried by the shaft, means between the cog wheels and the index for actuating the index, and means for holding either of the said wheels against turning, whereby when the plate is moved by turning of the shaft the index will also be moved and will be brought to point in the corresponding one of two directions when exposed to view.

15. The combination of a casing, marks adjacent the casing, a shaft within the casing, means whereby the shaft may be turned, the said means being adapted to retain the shaft in one position, a plate connected to the shaft and moving therewith the plate being normally out of view, an index movably carried on the plate, a plurality of rotatable elements on the shaft, a bevel gear engaging the said elements, means between the said gear and the index whereby turning of the gear will move the index, and means for holding either of the said elements against movement as the shaft is turned, the turning of the shaft bringing the plate into view with the index thereon pointing to one of the said marks.

16. The combination of a casing, a plate within the casing, a shaft on which the plate is mounted, movement of the shaft moving the plate, means for moving the shaft, the said means retaining the plate in one position, an index movably mounted on the said plate, the index being movable to a plurality of positions, a plurality of cog wheels carried on the shaft and freely rotatable thereon, means engaging each of the cogs and in operative relation to the said index for moving the same, and independent means for holding either of the said cogs against turning, the turning of the shaft bringing the plate and with it the index into view, the index pointing in a certain direction, the direction depending on which cog is held against turning.

17. The combination of a casing, a shaft within the casing, a plate carried by the shaft and movable therewith the casing being provided with an opening, means for turning the shaft whereby the plate may be brought into view adjacent the opening, the said means maintaining the shaft in one position with the plate out of view, an index pivotally supported on the plate, a plurality of cog wheels carried on the said shaft, a second shaft, a bevel gear on the second shaft and engaging the wheels carried on the said first shaft, the said second shaft being in engagement with the said index, the said cog wheels being freely rotatable on the said shaft, independent means carried by the casing and comprising electro-magnets operable from the driver's seat, and elements cooperating with the electro-magnets and the said cogs whereby either of the said cogs may be held against turning when the plate is moved to exposed position, the direction in which the index points in such exposed position depending on which of the cogs is held against turning.

18. The combination of a casing, a shaft within the casing, a plate within the casing and mounted on the shaft, the casing being provided with an opening, the plate being adapted to be moved adjacent the opening, means for turning the shaft, the said means maintaining the shaft and plate in one position with the plate out of view, an index pivotally carried on the plate, a plurality of gears carried by the shaft and freely rotatable thereon, cams on the shaft, a second shaft, a bevel gear on the second shaft and engaging the said first gears, the said second shaft being in operative relation with the said index, means comprising a plurality of electro-magnets and pivoted levers for holding either of the said gears against rotation as the shaft is turned, and pivoted dogs adapted to be actuated by the said cams, whereby when the plate is moved to exposed position the index will point in a certain direction and be held in such position while exposed.

19. The combination of a casing, a shaft within the casing, a plate mounted on the shaft and turning therewith, the casing being provided with an opening through which the said plate is adapted to be seen, means for turning the shaft, the said means normally maintaining the shaft, and with it the plate, remote from the opening and out of view, a second and smaller casing, the said shaft extending into the said second casing, a gear wheel at the end of the shaft, a second gear wheel within the smaller casing and in engagement with the first one, means comprising a spring-actuated drum in frictional engagement with the second gear for moving the said shaft and index, and means whereby the drum may be turned.

20. The combination of a casing, a shaft within the casing, an index, means carried by the shaft for supporting the index, the said means being adapted to be moved when the shaft is turned, a second casing, a drum within the second casing, a gear in frictional engagement with the drum, spring means for effecting such frictional engagement, means carried by the shaft and engaging the said gear, whereby turning of the gear will move the shaft, and means for turning the drum, whereby the gear may be turned, the said drum-turning means being adapted to turn the drum independently of the said gear by reason of the said frictional engagement between the gear and drum.

21. The combination of a casing, a shaft within the casing, an index within the casing, means carried by the shaft and turning therewith for supporting the index, the casing being provided with an opening through which the index may be seen when in one position, the said shaft being normally in such position that the index is out of view, a second casing, means within the second casing in operative relation with the end of the said shaft for turning the same, the said means comprising a drum and a spring within the drum, together with a gear in frictional engagement with the drum, there being spring means for effecting such frictional engagement, and means engaging the drum whereby it may be turned, the turning of the drum a certain distance bringing the index into view, further movement of the drum being permitted, the gear being held against turning therewith, a reverse turning of the drum bringing the index within the casing into normal position, the frictional engagement between the gear and the drum permitting movement of the one relatively to the other.

22. The combination of a casing provided with an opening whereby the interior thereof may be seen, a shaft within the casing, an index, means carried by the shaft and turning therewith, the said means supporting the index in movable relation thereto, means for maintaining the shaft and index remote from the said opening and out of view, means for moving the index and the said supporting means adjacent the opening, and other means coöperating with the index and the shaft, whereby movement of the shaft will move the said index relatively to the said supporting means as the said supporting means comes adjacent the opening.

23. The combination of a casing, a shaft within the casing, an index, means carried by the shaft and turning therewith and supporting the index, means for maintaining the index in one position when the said index supporting means is in one position, and other means for bringing the index to either one of two other positions when the said index supporting means is turned.

24. The combination of a casing, a shaft within the casing, a plate carried by the shaft and turning therewith, the casing being provided with an opening, an index movably mounted on the plate, means for keeping the plate and index out of view, means whereby the plate and index may be brought adjacent the said opening and into view with the index pointing in one position, and devices whereby as the plate is moved the index may be moved to point to either one of two other positions while coming into view.

In testimony whereof I have signed my name to this specification in the presence of two subscribing witnesses.

CHARLES F. MARSTON.

Witnesses:
LAURENCE J. GALLAGHER,
JOHN P. DAVIS.